G. GREINER.
HOOF TRIMMER.

No. 181,259.

Patented Aug. 22, 1876.

Witnesses:
P. C. Dieterich.
F. H. Duffy.

Inventor:
Geo. Greiner
Per: C. H. Watson & Co. Attorneys.

UNITED STATES PATENT OFFICE.

GEORGE GREINER, OF BOWLING GREEN, OHIO.

IMPROVEMENT IN HOOF-TRIMMERS.

Specification forming part of Letters Patent No. 181,259, dated August 22, 1876; application filed July 22, 1876.

*To all whom it may concern:*

Be it known that I, GEORGE GREINER, of Bowling Green, in the county of Wood and State of Ohio, have invented certain new and useful Improvements in Hoof-Trimmers; and I do hereby declare that the following is a full, clear, and exact description thereof, which will enable others skilled in the art to which it appertains to make and use the same, reference being had to the accompanping drawings, and to the letters of reference marked thereon, which form a part of this specification.

The nature of my invention consists in the construction and arrangement of a hoof-trimmer, as will be hereinafter more fully set forth.

Figure 1:
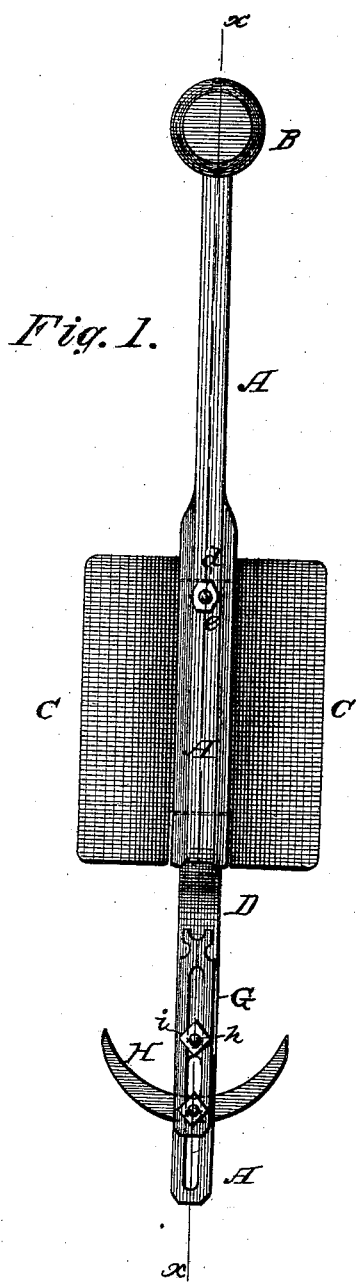
Figure 2:
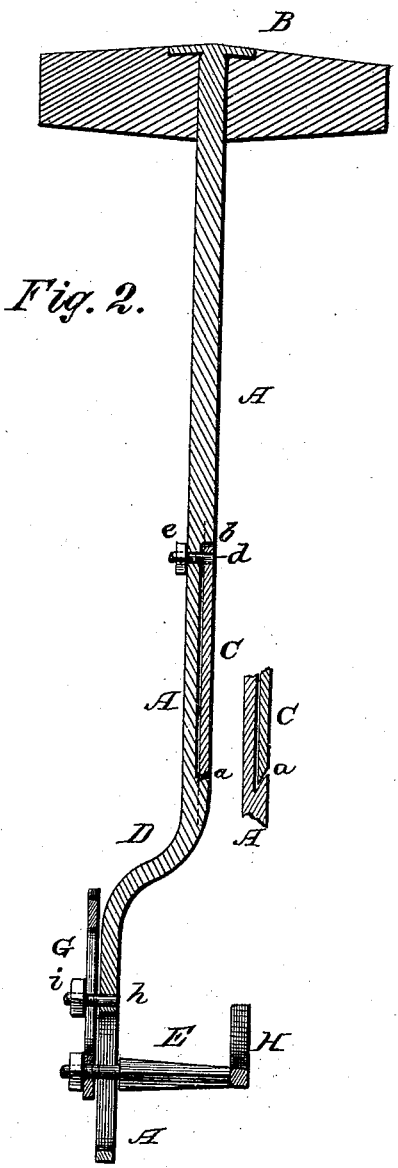

In the annexed drawing, Figure 1 is a side elevation of my improved hoof-trimmer. Fig. 2 is a longitudinal section of the same.

A represents the shank or staff of the hoof-trimmer, provided at the end with the handle B. C is the knife or blade, sharpened upon both edges, and fastened to the shank or staff in the following manner: In the staff is formed one inclined shoulder, a, and one square shoulder, b, and the blade C has slots in its ends to correspond with said shoulders. One end of the blade is fitted in under the inclined shoulder a, when the other end is easily slipped down in place against the square shoulder b. Near this end a bolt, d, is then passed through the parts, and a nut, e, screwed on to fasten the parts firmly together. Beyond the blade C the shank A is bent, as shown at D, to clear the frog, so that the knife may trim the hoof from heel to toe at will, without in the least touching the frog. The end of the shank A is slotted, and through the same is passed an arm, E, which is swiveled in a slide, G, placed on the staff. The lower end of the arm E is formed with a semicircular claw, H. The slide G is adjusted and held in any position, by means of a bolt, h, and nut i, so that the trimmer will fit any-sized hoof.

In operation the hand is placed over the claws, and the end of the shank, and the hoof, and then the trimmer may be operated by the other hand. The handle B stands at right angles to the plane of the blade C, in order that the blade may be controlled at will, and cut or shave the hoof to any depth that may be required, without the slightest injury to the frog of the hoof; and may be reversed, cutting either right or left.

The blade can easily be removed for sharpening, and be replaced again.

Having thus fully described my invention, what I claim as new, and desire to secure by Letters Patent, is—

In a hoof-trimmer, the shank A formed with the bend D, inclined shoulder A, and square shoulder b, in combination with the blade C, bolt d, and nut e, as and for the purposes herein set forth.

In testimony that I claim the foregoing as my own I affix my signature in presence of two witnesses.

GEORGE GREINER.

Witnesses:
WILLIAM COEN,
ROBT. S. DAVIDSON.